UNITED STATES PATENT OFFICE.

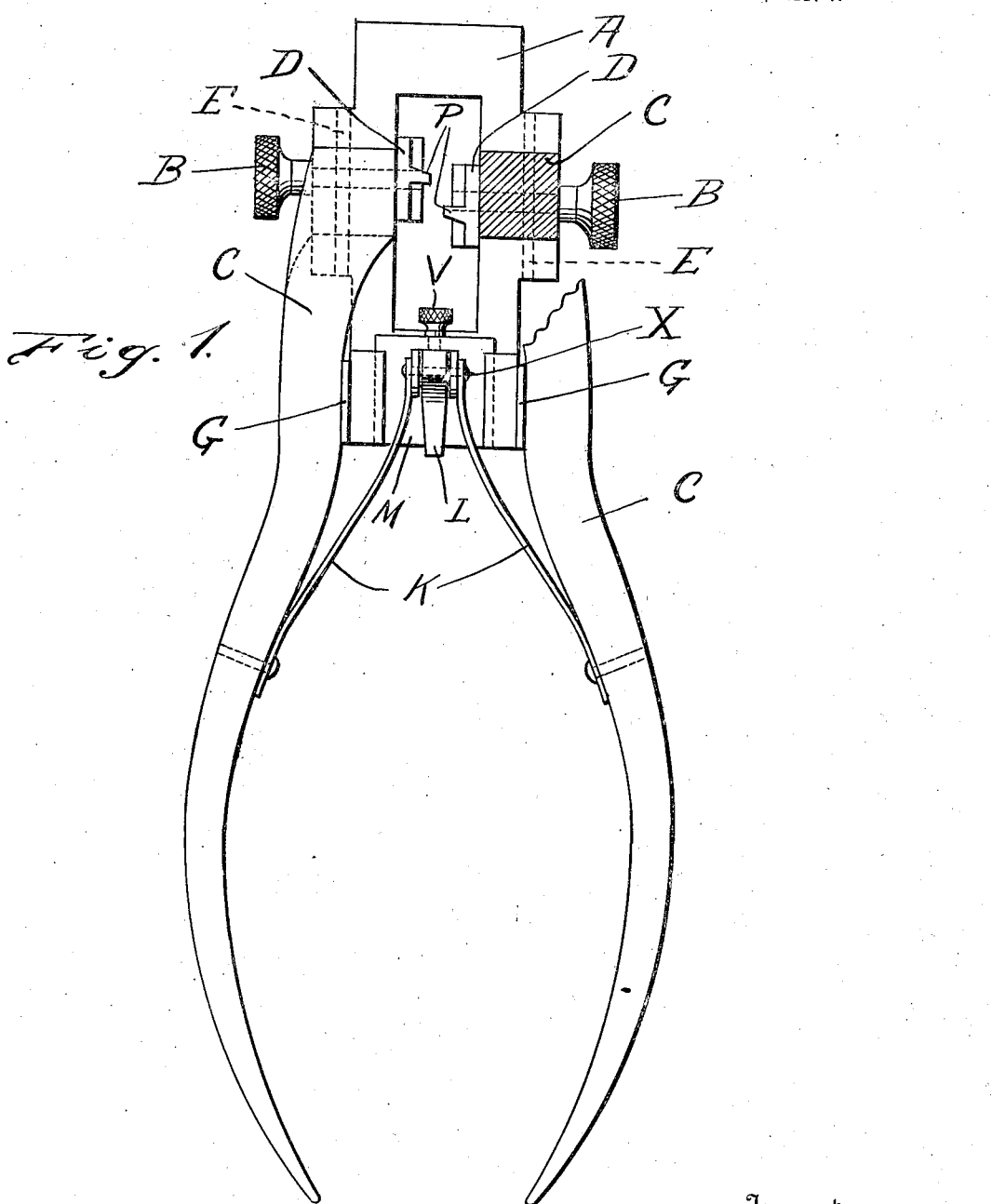

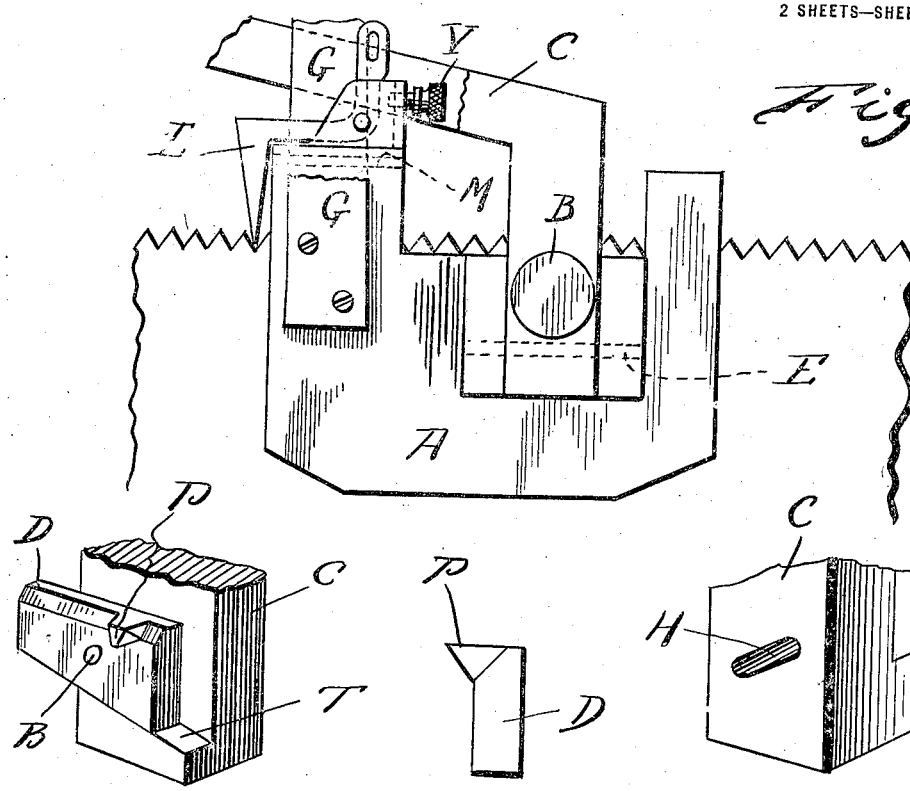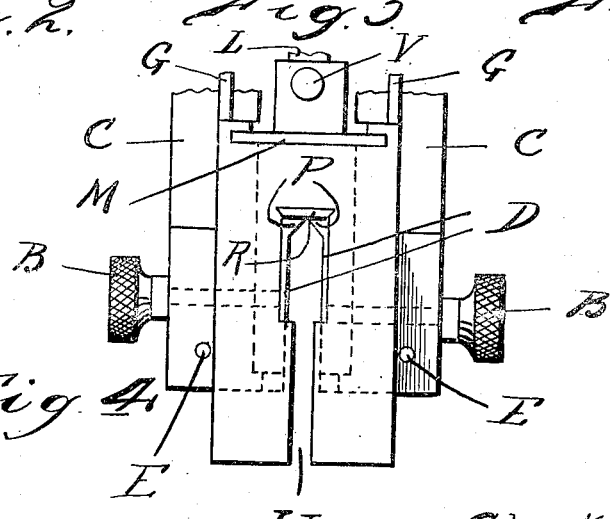

CLARK P. ELLIS, OF CONNEAUT LAKE, PENNSYLVANIA.

SAW-SET.

1,342,327.

Specification of Letters Patent.  Patented June 1, 1920.

Application filed May 25, 1918. Serial No. 236,607.

*To all whom it may concern:*

Be it known that I, CLARK P. ELLIS, a citizen of the United States, residing at Conneaut Lake, in the county of Crawford and State of Pennsylvania, have invented new and useful Improvements in Saw-Sets, of which the following is a specification.

This invention relates to improvements in devices for setting the teeth of saws of that character wherein a pair of movable dies carry the setting points and permit of an adjustment of the device to conform to the number of teeth of the saw blade to the inch and according to the grade of the teeth.

It is the object of the present invention to provide a tool for setting hand saws, band saws, etc., which will spring the alternate teeth in steel or iron saws in such a manner as to give the saw the so-called set, *i. e.*, at an angle to the plane of the saw blade.

A further object of the invention is to provide a saw set in which two teeth will be set at one and the same time and at the same time to make the set perfectly uniform.

It is also a feature of this invention to provide the setting element with a point adapted to operate on the saw teeth without injury to the points of said teeth.

A further feature of novelty consists in providing means for raising or lowering the dies in relation to the teeth of the saw for engaging the teeth with the setting points near their top or farther below said top.

A still further feature of this invention is to provide means for automatically carrying the tool forward at each operation toward the next two teeth to be set and to operate the die carrying handles directly from above and in line with the saw blade for producing an unequaled ease of operation and removing any possibility of strain upon the blade of the saw apt to bring it either temporarily or permanently out of true or to produce a bend or kink in the blade.

Other features of novelty will be more fully described in connection with the accompanying drawing and will be more particularly pointed out in and by the appended claims.

In the drawing:

Figure 1 shows the tool according to the present invention in plan with the upper part of the handles broken away in order to more clearly illustrate the block construction.

Fig. 2 is a perspective view of one of the dies on one of the handles or levers, showing the beveled setting point.

Fig. 3 is a detail view of one of the dies with its setting point.

Fig. 4 is an end view showing the saw blade slot.

Fig. 5 is a detail view, partly broken away and showing the foot part of one of the levers with the slot for the passage of the die adjusting screw.

Fig. 6 illustrates the operation of one of the blade feeding dogs.

Like characters of reference designate similar parts throughout the different figures of the drawing.

In these views, A is the main block of substantially U shape so as to provide the slot U to receive the saw blade. The rear part of the block, at its upper edge is provided with an extension, to which the handle engaging springs G are secured. These springs extend above said extension. The handles C are each of substantially L shape in side elevation and the foot part of each handle has its lower end pivoted to the block A by the pin E. This pin is located in the side extension of the block. In this way the foot portion has rocking movement on the pin so that the main portions of the handles may move toward and away from each other. The foot portion of each handle, intermediate its ends is provided with an inclined shoulder T, upon which the die D is supported. The die is provided with an inclined face which engages said shoulder and said die is adjustably held in place on said shoulder by the set screw B. This screw passes through the inclined slot H in the foot portion and its inner end is secured to said die. It will thus be seen that by moving the screw in the slot H the die will be adjusted on the shoulder T. As will be seen the upper outer edge of each die is beveled and adjacent one end of this beveled portion is located a projection or setting point P. The sides of this point converge downwardly and its lower face is inclined at the same angle as the beveled edge of the opposite die so as to firmly grip the saw tooth between itself and said beveled edge. When the dies are properly set they will be spaced apart so as to engage two teeth of the saw. The springs G engage the inner faces of the main parts of the handles so as to hold said parts at the outermost limits of their movement. When the handles are pressed together the resistance of the springs will be overcome and the foot parts of the handles will rock on the pivots E so that the dies will be brought together and press the two saw teeth in opposite directions and thus properly set said teeth.

In order to cause the tool to travel upon the saw a sliding block M is suitably arranged upon the block A adjacent its rear end. This block is provided with a pair of upwardly projecting ears between which is pivoted a feeding dog L. This dog is provided with a slot at its upper end, through which passes a pin X which is carried by the elongated springs K, the other ends of said springs being secured to the handles. The lower end of the dog is pointed and is adapted to engage the recesses between the teeth of the saw. It will thus be seen that when the handles are pressed together the springs K will rock the dog on its pivot so as to raise the point out of contact with the saw and upon further movement of the handles the sliding block M will be forced forwardly. When the handles are released the springs K will first cause the dog L to lower and engage the saw and thus prevent movement of the block M. Further movement of the handles will then cause the block A to move forwardly into position to cause the setting points to engage the next teeth. In order to regulate the travel of the tool along the saw I provide an adjusting screw V on the block M to limit the movement of the dog L.

A toothed block R of chilled steel is suitably provided to form a bearing adapted to carry the weight of the tool upon the teeth of the saw without causing injury to the fine points of said teeth.

From the above description it will be clear that the operation of the dies D is in plain view at all times and that the dies are interchangeable with each other and that their sliding arrangement upon the inclined shoulders of the handles will allow a raising and lowering of the same in relation to the teeth of the saw in order to engage more or less material of the tooth and thus giving the tooth less set or spring, or more set according to the movement of the die up or down on the inclined shoulders. This movement of the dies is permitted by the arrangement of the inclined slot in the handles C through which the screw B passes upon which the dies are arranged. The travel of the dies upon the inclined shoulders T not only determines the amount of set but performs also another function, i. e., to bring the setting points P, P closer together or forcing the same farther apart to conform to the number of teeth to the inch contained on the saw.

The device operates in the following manner:

The saw to be set is placed in front of the operator with its teeth horizontally disposed and the blade at a right angle to the ground. The tool is now placed upon the saw by introducing the blade through the slot U of the main block A, with the dies so located that the center of the setting points is in the center line of the teeth to be set. Hereupon the handles are firmly gripped with the right hand and pressed together which will carry the dies D, D together, so that the blade of the saw is firmly held between them, and their setting points will force the teeth between against the beveled face of the points of the opposite dies and thus give to the teeth the desired set.

After the setting of the two teeth the pressure upon the handles is released permitting the feeding dog L to drop from its raised position into a horizontal position between two of the teeth of the blade and will impart a motion to the block M which will force the setting tool to ride forward upon the blade to the next two teeth to be set.

By the arrangement of the springs K, K as shown, secured to the handles C, C and to the upper part of the feed dog, the operation of the feed dog and of the sliding block M is effected so as to successively feed the tool across a saw blade, while the adjusting screw V regulates the arc of movement of the dog according to the width of the space between the single teeth of a saw.

It is believed that the advantages and utility of my invention will be clearly understood from the foregoing description and while I have herein shown and described specific forms of the elements constituting my invention, I do not wish to be limited thereto, but may resort to such modifications as fall within the scope of my claims.

I claim:

1. In a saw setting tool of the character described, two movable levers, a main block carried by said levers, two opposed dies secured to said block, opposed setting points on said dies, and feeding means operating to feed the tool longitudinally of a saw between each operation of the setting points.

2. In a tool of the character described for setting saws, two movable levers, a main block carried by said levers, inclined shoulders on the inner faces of said levers, near their upper ends, dies movably secured to said block and resting upon said shoulders, and feeding means operating to feed the tool longitudinally of a saw between each operation of the setting points.

3. In a tool of the character described for setting saws, two movable handles or levers, pins for guiding the upper ends of said levers, a main block to which said pins are secured, carried by said levers, springs for holding the handles normally separated, said block having an opening for the introduction of a saw, a bearing supporting the tool upon a saw, means for holding the saw during the operation of the tool, and setting points for setting two teeth upon each operation, and feeding means operating to feed the tool longitudinally of a saw between each operation of the setting points.

4. In a saw setting tool of the character described, two movable levers, a main block carried by said levers, two opposed dies secured to said block, opposed setting points on said dies having beveled sides forming a V-groove adapted to receive the opposite point during the setting operation, a sliding block on said main block, a feed dog secured to said sliding block, means for feeding said dog and block longitudinally to the saw upon the operation of said levers, and means for regulating said feeding operation according to the number and grade of the teeth to the inch.

5. In a saw setting tool of the character described, two movable levers, a main block carried by said levers, two opposed dies secured to said block, opposed setting points on said dies having beveled sides forming a groove adapted to receive the opposite point during the setting operation, a sliding block on said main block, a feed dog secured to said sliding block, two springs secured with their lower ends to the inner faces of said levers, and with their upper ends to said dog, and an adjusting screw for regulating the feeding operation of the tool according to the number and grade of the teeth to the inch.

6. An instrument of the character described comprising in combination, two movable levers, a main block on said levers provided with a slot for the introduction of a saw blade, movable and exchangeable dies on said block, screws carrying said dies and loosely passed through said levers, pins in said main block on which the upper ends of said levers slide during the operation of said levers, setting points on said dies forming part of their upper edges, adapted to set the teeth of a saw introduced through a slot in the main block, and means for feeding said instrument longitudinally to a saw blade upon and after each operation of said setting points and levers, substantially as described.

7. An instrument of the character described, comprising in combination, a pair of movable lever handles, a slotted main block on said handles, a pair of inclined shoulders on the inner side of said handles near their upper edge, adjustable dies resting on said shoulders, means on said dies for uniformly setting two teeth of a saw upon the operation of said levers, means for carrying said levers back into their normal spread position, a bearing block for carrying the weight of the instrument upon a saw, said dies being capable of adjustment for engaging the teeth of a saw for a predetermined part of their length, means for adjusting said dies, and means for feeding the tool or instrument longitudinally of a saw after each setting operation and for regulating the feeding operation according to the grade and number of teeth to the inch, substantially as described.

In testimony whereof I affix my signature.

CLARK P. ELLIS.